United States Patent
Tamura et al.

(10) Patent No.: US 6,960,236 B1
(45) Date of Patent: Nov. 1, 2005

(54) CLEAN ROOM

(75) Inventors: Yoshio Tamura, Settsu (JP); Yasuyoshi Shinoda, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/129,734

(22) PCT Filed: Nov. 6, 2000

(86) PCT No.: PCT/JP00/07800

§ 371 (c)(1),
(2), (4) Date: May 10, 2002

(87) PCT Pub. No.: WO01/36820

PCT Pub. Date: May 25, 2001

(30) Foreign Application Priority Data

Nov. 12, 1999 (JP) .......................................... 11-322902

(51) Int. Cl.⁷ ........................... B01D 53/06; B01J 20/18
(52) U.S. Cl. ................................ 55/385.2; 55/DIG. 18; 55/DIG. 46; 454/187; 62/271; 62/331; 62/336; 62/407; 502/64; 502/67; 423/245.1; 423/210; 423/213.2
(58) Field of Search ........................ 55/385.2, DIG. 18, 55/DIG. 46; 454/187; 62/271, 331, 336, 407; 502/64–67, 77–79; 423/245.1, 210, 213.2

(56) References Cited

U.S. PATENT DOCUMENTS

| | | | | |
|---|---|---|---|---|
| 4,699,640 A | * | 10/1987 | Suzuki et al. ............... | 55/385.2 |
| 4,795,482 A | * | 1/1989 | Gioffre et al. ................. | 55/389 |
| 5,047,139 A | * | 9/1991 | Gortsema et al. ............ | 208/111 |
| 5,052,188 A | * | 10/1991 | Komarneni et al. ............ | 62/94 |
| 5,122,170 A | * | 6/1992 | Satoh et al. ................. | 55/385.2 |
| 5,284,638 A | * | 2/1994 | Hertl et al. .................. | 502/407 |
| 5,407,880 A | * | 4/1995 | Ikeda et al. .................... | 502/67 |
| 5,584,916 A | | 12/1996 | Yamashita et al. | |
| 6,033,301 A | * | 3/2000 | Suwa .......................... | 454/187 |
| 6,147,023 A | * | 11/2000 | Hirayama et al. ............. | 502/64 |
| 6,250,095 B1 | * | 6/2001 | Kametani et al. ............. | 62/271 |
| 6,358,139 B1 | * | 3/2002 | Renz .......................... | 454/187 |
| 6,415,859 B1 | * | 7/2002 | Kametani et al. ............. | 62/271 |

FOREIGN PATENT DOCUMENTS

| | | |
|---|---|---|
| DE | 2729345 | 1/1978 |
| DE | 4446550 A1 | 6/1996 |
| EP | 0244061 | 11/1987 |
| EP | 0482780 A1 | 4/1992 |
| EP | 0914864 A2 | 5/1999 |
| EP | 1030126 A1 | 8/2000 |
| EP | 1195195 A1 | 4/2002 |
| JP | 4-306450 | 10/1992 |
| JP | 7-24239 | 1/1995 |
| JP | 7-256048 | 10/1995 |
| JP | 8-266853 | 10/1996 |
| JP | 8-303827 | 11/1996 |
| JP | 9-145112 | 6/1997 |
| JP | 10-85546 | 4/1998 |
| WO | 99/15836 | 4/1999 |

* cited by examiner

*Primary Examiner*—Blaine Copenheaver
*Assistant Examiner*—Minh-Chau T. Pham
(74) *Attorney, Agent, or Firm*—Wenderoth, Lind & Ponack, L.L.P.

(57) ABSTRACT

A clean room has a cleaned air feeding apparatus 1 having a rotor 2 adsorbing gaseous chemical substances to an adsorbing part 16 and desorbing the adsorbed gaseous chemical substances at the regenerating part 17. Drive 4 drives the rotor 2 to the adsorbing part 16 and the regenerating part 17. The gaseous chemical substances contained in the air are adsorbed, for removal, to the adsorbing part 16, and cleaned air is fed into a clean room main body 32. Heated regenerated air is fed to the regenerating part 17 so as to desorb the adsorbed gaseous chemical substances from the air.

12 Claims, 3 Drawing Sheets

22 HONEYCOMB-LIKE LAMINATE BODY

CLEAN ROOM

TECHNICAL FIELD

The present invention relates to a clean room comprising a cleaned air feeding apparatus, and particularly to a clean room for removing gaseous chemical substances in air, capable of supplying cleaned air having a cleanliness class of 1000 or lower.

Cleaned air having a cleanliness class n refers to air containing n dust particles having a particle diameter of 0.1 μm or larger per cubic foot of air. Since ambient air generally contains about $10^8$ dust particles per cubic foot of air, cleaned air of a cleanliness class of 1000 can be said to be air in an ultra-pure clean state.

BACKGROUND ART

A clean room known heretofore is a room with air containing dust in low concentration (with a cleanliness class of about 10,000). Hence, dust contained in the air outside the clean room is removed by a dust filter, and the resulting air is supplied to the clean room. Recently, however, gaseous chemical substances such as ammonia, sulfur oxide, and organic solvents are increasing in the environment, and the concentration of such gaseous chemical substances is required to be reduced to several parts per billion (ppb) for the cleaned air supplied to the clean room.

In order to remove the gaseous chemical substances mentioned above, cation exchange fibers have been used to adsorb alkaline substances such as ammonia, or anion exchange fibers have been used to adsorb acidic substances such as sulfur oxides, and ammonia and sulfur oxides have been removed by using these ion exchange fibers in combination. Furthermore, ammonia and sulfur oxides have been removed together with an organic solvent by using active carbon carrying thereon an acidic substance or an alkaline substance.

However, ion exchange fibers as well as active carbon filters carrying thereon an acidic substance or alkaline substance, are not easily regenerated, and, in case the adsorbed gaseous chemical substances amount to a predetermined quantity or greater, in general, these fibers and filters must be exchanged about once a year. Furthermore, for instance, the two types of ion exchange fibers and active carbon filters must be prepared depending on the type of gaseous chemical substances, and the ion exchange fibers and active carbon filters are extremely expensive. As a measure to elongate the life of ion exchange fibers and active carbon filters, a method for removing, to some extent, ammonia and sulfur oxide easily soluble to water is proposed by setting a scrubber for spraying water to the stage prior to the removal of gaseous chemical substances. Still, however, the life of ion exchange fibers and active carbon have been found to be extended merely to about 2 to 2.5 times.

An object of the invention is to provide a clean room equipped with a cleaned air feeding apparatus in which adsorption and regeneration are carried out simultaneously, so as to enable semi-permanent use of the apparatus, and which is yet capable of removing all of the gaseous chemical substances.

DISCLOSURE OF THE INVENTION

The invention relates to a clean room comprising a cleaned air feeding apparatus for cleaning air containing gaseous chemical substances and supplying the cleaned air having a cleanliness class of 1000 or lower. The cleaned air feeding apparatus carries an adsorbing member for adsorbing and desorbing gaseous chemical substances which comprises a blend of weak hydrophobic zeolite and strong hydrophobic zeolite blended at a predetermined ratio. The cleaned air feeding apparatus consists of an adsorbing part for adsorbing, the gaseous chemical substance from air and a regenerating part for desorbing the gaseous chemical substance by using heated air. The adsorbing part and the regenerating part are switched to supply to the clean room main body the air from which the gaseous chemical substance is removed by adsorbing the gaseous chemical substance in the adsorption part.

In accordance with the invention, gaseous chemical substances are removed from air by adsorption removal in the adsorbing part using an adsorbent and the resulting air is supplied to the clean room main body. The adsorbent that has adsorbed the gaseous chemical substances is regenerated in the regenerating part using heated air. Since the adsorbing part and the regenerating part are used by switching, the adsorbent can be used semi-permanently. Hence, pertinently, the adsorbing part can sufficiently adsorb gaseous chemical substances and can supply a sufficiently cleaned air to the clean room main body.

Since most of gaseous chemical substances are often adsorbed to the surface of the fine dust particles contained in air, the fine dust in the air can be simultaneously removed upon cleaning the gaseous chemical substances by using the cleaned air feeding apparatus. In this manner, there can be obtained cleaned air having a cleanliness class of 1000 or lower, preferably, 100 or lower.

Further, the invention is characterized in that the cleaned air feeding apparatus comprises a honeycomb-like laminate body carrying an adsorbing member for adsorbing and desorbing gaseous chemical substances.

A drive means transfers the honeycomb-like laminate body between an adsorbing part and a regenerating part, wherein the honeycomb-like laminate body is separated into the adsorbing part for adsorbing the gaseous chemical substances in air and the regenerating part for desorbing the adsorbed gaseous chemical substances into air.

A cleaned air guide part passes air containing gaseous chemical substances through the adsorbing part of the honeycomb-like laminate body to clean the air and supplies the cleaned air to the clean room main body, A regenerated air guide part feeds the heated air to the regenerating part of the honeycomb-like laminate body, and desorbs and discharges gaseous chemical substances from the adsorbing member to the heated air.

Since the adsorbing member for adsorbing and desorbing the gaseous chemical substances is carried on a honeycomb-like laminate body and is driven between the adsorbing part and the regenerating part by drive means according to the invention, sufficiently cleaned air can be supplied to the clean room main body, because the adsorption and desorption can be efficiently effected so as to constantly allow the adsorbing part to sufficiently adsorb the gaseous chemical substances.

The invention is also characterized in that the cleaned air feeding apparatus comprises a rotor constituted such that air may pass along an axial direction of the honeycomb-like laminate body formed in an approximately cylindrical shape.

A drive means rotates the rotor around an axial line thereof.

An air guide part is formed on both ends in an axial direction of the rotor, by sectioning, along a peripheral direction of the rotor, in the order of an adsorbing part, a regenerating part, and a cooling part. The air guide part comprises a cleaned air guide part for supplying a gas containing gaseous chemical substances to one side of the adsorbing part in the axial direction of the rotor, and supplying the gas to the clean room main body from the other side of the adsorbing part in the axial direction of the rotor.

A regenerating air guide part supplies air for regeneration to the other side of the regenerating part in the axial direction of the rotor, and ejects the air from the one side of the regenerating part.

A cooling air guide part supplies air for cooling to the other side of the cooling part in the axial direction of the rotor and ejects the air from the one side of the cooling part in the axial direction of the rotor.

A heating means heats the air supplied to the regenerating part.

According to the present invention, the honeycomb-like laminate body is formed in an approximately cylindrical shape to provide a rotor, and is rotation driven by the drive means around an axial line in the order of the adsorbing part, the regenerating part, and the cooling part. At the adsorbing part, the air containing the gaseous chemical substances flowns from the one side to the other side of the adsorbing part in the axial direction of the rotor for adsorption removal of the gaseous chemical substances contained in the air. At the regenerating part, the gaseous chemical substances adsorbed at the adsorbing part are desorbed by the air heated by heating means to regenerate the rotor. At the cooling part, the rotor heated by the regenerating air in the regenerating part is cooled to a temperature suitable for adsorbing gaseous chemical substances at the adsorbing part. In this manner, cleaned air is continuously supplied to the clean room main body.

Furthermore, the invention is characterized in that a dust removing filter is provided between the adsorbing part inside the cleaned air guide part and the clean room main body.

According to the invention, dust is removed from the air subjected to the removal of the gaseous chemical substances by using a dust filter.

The invention is further characterized in that a chemical adsorption filter is provided between the adsorbing part inside the cleaned air guide part and the clean room main body.

In accordance with the invention, the gaseous chemical substances, remaining in trace amounts which were not adsorption—removed in the adsorbing part of the cleaned air feeding apparatus, are adsorbed by the chemical adsorption filter.

The invention is further characterized in that a temperature and moisture controlling means is provided between the adsorbing part inside the cleaned air guide part and the clean room main body.

According to the invention, the temperature and humidity of the air from which the gaseous chemical substances were removed are further controlled.

The invention is also characterized in that the adsorbing member for the gaseous chemical substances comprises 10 to 90% by weight of a weak hydrophobic zeolite and 90 to 10% by weight of a strong hydrophobic zeolite.

According to the invention, the blend ratio of zeolite used for the adsorbing member differs depending on the types of gaseous chemical substances contained in the air. More specifically, the ratio of weak hydrophobic zeolite is increased in the case of cleaning air containing ammonia and sulfur oxide in a relatively high amount, and the ratio of strong hydrophobic zeolite is increased in the case of cleaning air containing an organic solvent in a relatively high amount. The zeolites are each contained in a content ratio of from 10 to 90% by weight.

The invention is further characterized in that the weak hydrophobic zeolite has an $SiO_2/Al_2O_3$ ratio in a range of from 5 to 70 (by molar ratio), and that the strong hydrophobic zeolite has an $SiO_2/Al_2O_3$ ratio in a range greater than 70 (by molar ratio).

In general, zeolite is expressed by the molecular formula of $aM_2O_x \cdot Al_2O_3 \cdot mSiO_2 \cdot bH_2O$, in which M represents an alkali or an alkaline earth metal, x represents the atomic valence thereof, and m represents the molar ratio $SiO_2/Al_2O_3$ of $SiO_2$ (silica) and $Al_2O_3$ (alumina). A hydrophobic zeolite yields an m smaller than 5. In the invention, zeolites having an m in a range of from 5 to 70 are regarded as weak hydrophobic zeolites, and those having an m exceeding 70 are regarded as strong hydrophobic zeolites. The amount of the zeolites carried on the honeycomb laminate body is preferably in a range of from 30 to 90% (by weight) with respect to the honeycomb laminate body.

BRIEF DESCRIPTION OF THE DRAWINGS

Other and further objects, features, and advantages of the invention will be more explicit from the following detailed description, taken with reference to the drawings, wherein.

BEST MODE FOR CARRYING OUT THE INVENTION

The invention is described in further detail by way of the mode for carrying out the invention.

Figure 1:
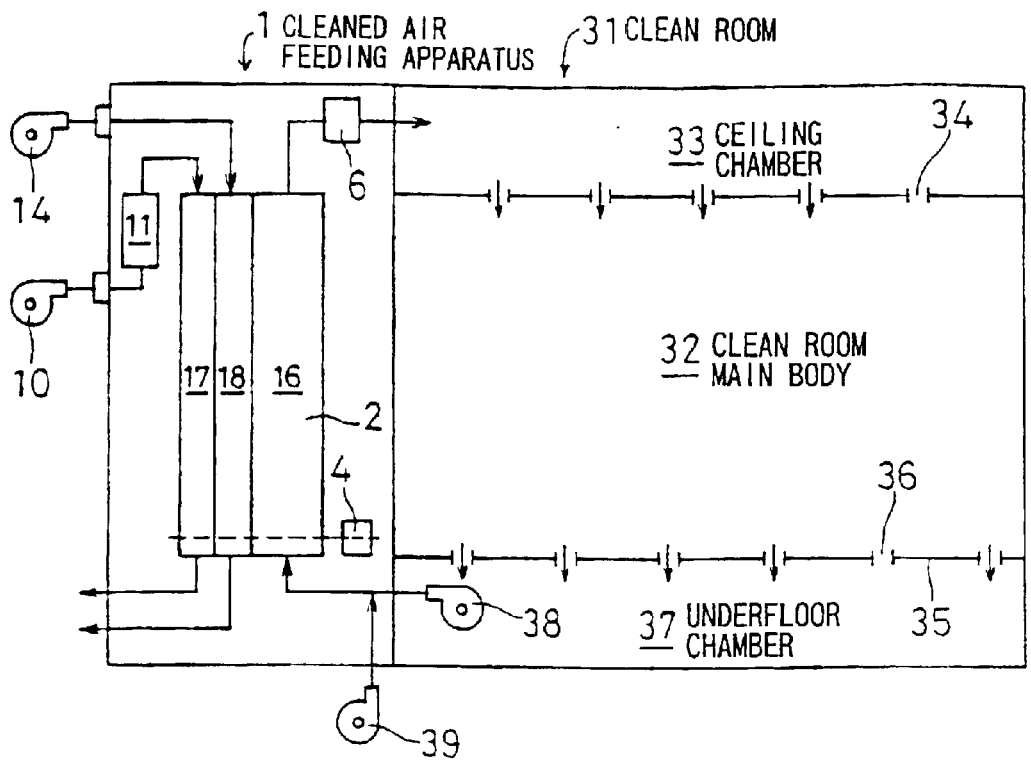
FIG. 1 shows the constitution of a clean room 31 according to an embodiment of the invention.

In FIG. 1 is shown the constitution of a clean room 31 according to an embodiment of the invention. The clean room 31 comprises a clean room main body 32 and a cleaned air feeding apparatus 1. The air cleaned in the cleaned air feeding apparatus 1 is supplied to the clean room main body 32 through plural ejection outlets 34 provided in a ceiling chamber 33. The air inside the clean room main body 32 is sucked from plural suction outlets 36 provided in the floor 35 to underfloor chamber 37 by means of a fan 38, is sent to the cleaned air feeding apparatus 1, and is cleaned and circulated to the ceiling chamber 33. As small amount of outside air is supplied to the outlet of the fan 38 by using an outside air supply means 39 as to maintain the inside of the clean room main body 32 at a positive pressure to prevent air from directly intruding into the clean room main body 32 through the gaps.

Figure 2:
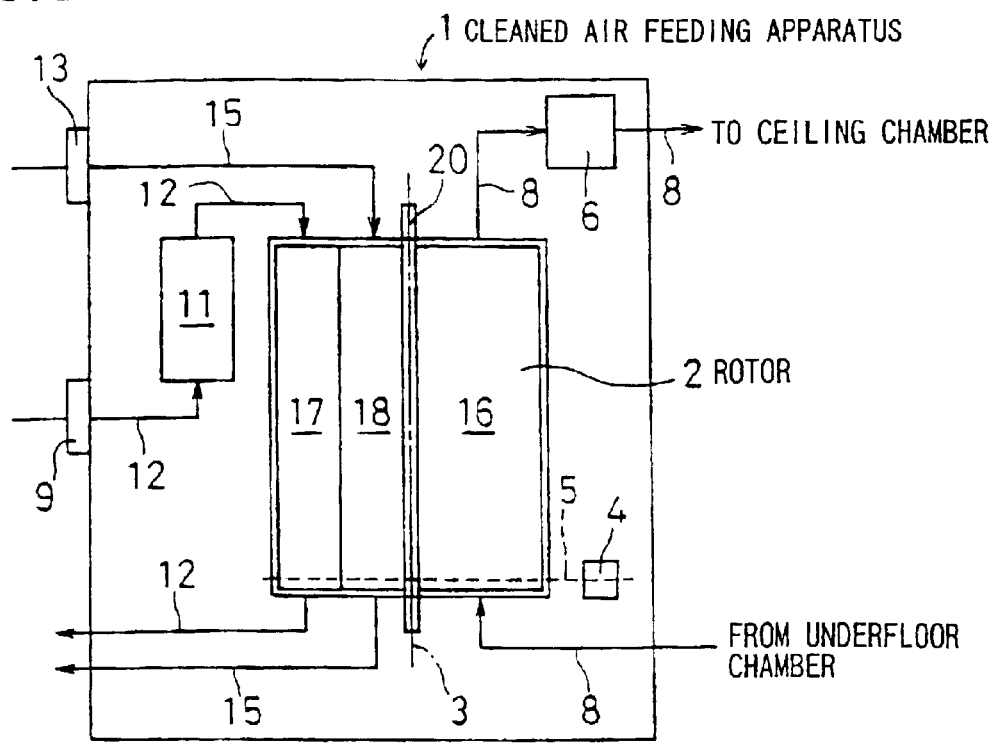
FIG. 2 shows a system diagram of a cleaned air feeding apparatus 1 for use in a clean room according to the invention.
Figure 3:
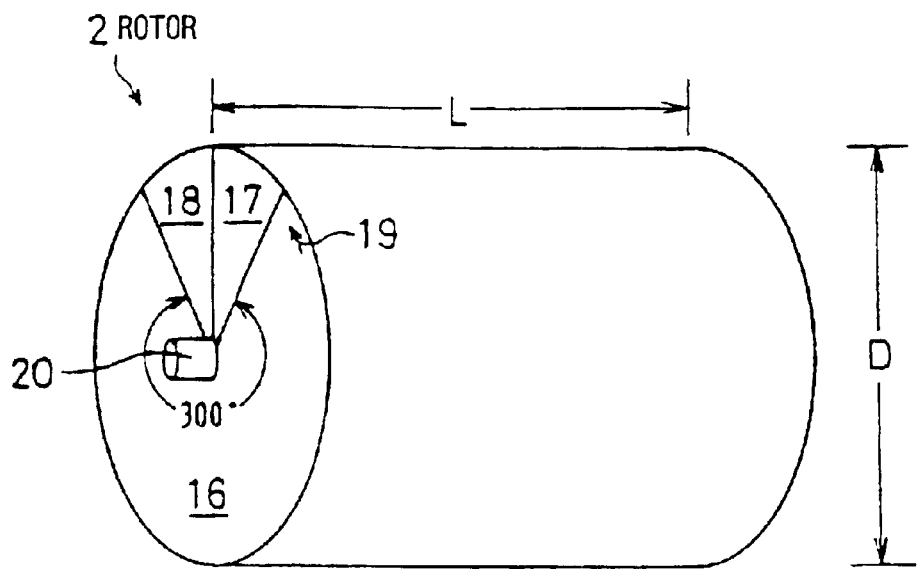
FIG. 3 shows a perspective view of a rotor 2.

In FIG. 2 is shown a system diagram of an example of the cleaned air feeding apparatus 1. A rotor 2 is provided, for instance, in a cylindrical shape having a diameter D of 300 mm and a length L of 400 mm, and is rotated at a rate of 2 revolutions per hour around an axial line 3 by using a drive motor 4 via a belt 5. FIG. 3 shows a perspective view of the rotor 2. The rotor 2 comprises an adsorbing part 16 provided for a range of 300° in the peripheral direction, further on the down stream 19 side in the rotating direction of the adsorbing part 16 is a regenerating part 17 provided for a range of 30° and a cooling part 18 provided on the down stream side in the rotating direction of the regenerating part 17. A rotary shaft 20 is set in the center.

The circulated air and the outside air are each supplied from the fan 38 and the outside air supply means 39, respectively, to the adsorbing part 16 of the rotor 2 via a cleaned air guide part 8, such that the gaseous chemical substances are adsorbed by the adsorbing part 16 of the rotor 2. In this manner, the resulting cleaned air is ejected to the ceiling chamber 33 through the cleaned air guide part 8 and the dust filter 6. On the other hand, regenerating air is moved by the regenerating air fan 10, and after passing through the filter 9, the air is heated to 180° C. by means of a heater 11 and supplied to the regenerating part 17 of the rotor 2 via the regenerating air guide part 12, such that the gaseous chemical substances adsorbed by the rotor 2 may be desorbed and discharged to the outside of the cleaned air feeding apparatus 1 via the regenerating air guide part 12. Since the regenerating part 17 of the rotor 2 is heated to ca. 180° C. by the regenerating air, cooling to approximately room temperature is effected at the cooling part 18 by using the air of the cooling part. The cooled air is sucked by the cooling fan 14, and is supplied to the cooling part 18 of the rotor 2 via the filter 13 and cooling air guide part 15 so as to cool the rotor 2, and is then discharged to the outside of the cleaned air feeding apparatus 1 via the cooling air guide part 15. In the rotor 2, by flowing the air to be cleaned, which is sent to the adsorbing part 16, in a reverse flow direction with respect to the flow direction of the regenerating air sent to the regenerating part 17 and the cooling air sent to the cooling part 18, the adsorption, desorption, and cooling are efficiently performed.

As another embodiment of the invention, there can be mentioned a cleaned air feeding apparatus 1 in which the dust filter 6 is omitted. Further embodiments of the invention can comprise, at the position shown by symbol 6 in FIG. 1, one, two, or all selected from the group consisting of a dust filter, a chemical adsorption filter, and moisture control means.

Figure 4:
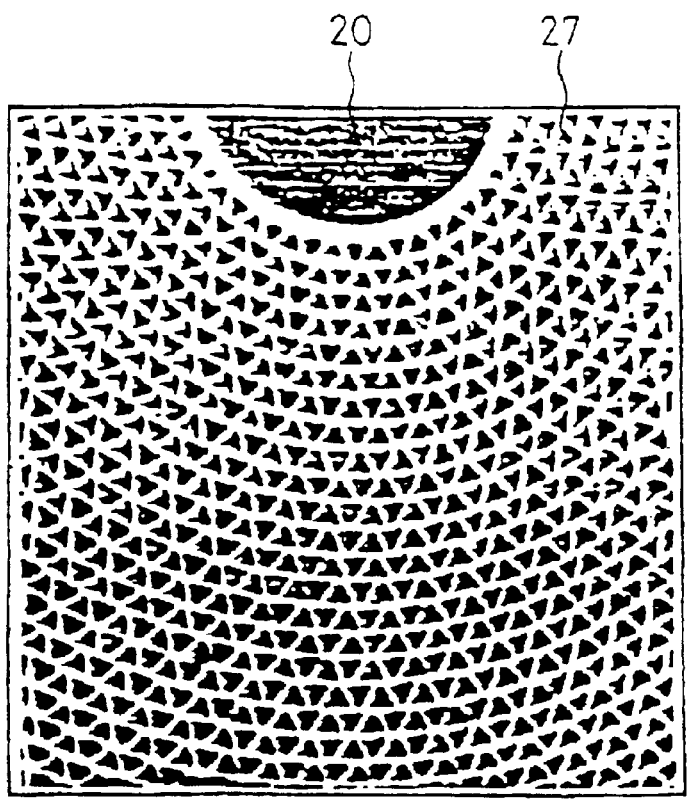
FIG. 4 shows an enlarged planar view of a honeycomb-like laminate body 22.

In FIG. 4 is shown an enlarged planar view of a part of the honeycomb-like laminate body 22 for use as an adsorbing body for gaseous chemical substances of the invention. In the case of forming the body into a cylindrical rotor 2, it is set such that the honeycomb-like fine pores 27 may be entrained in the axial direction.

Figure 5:
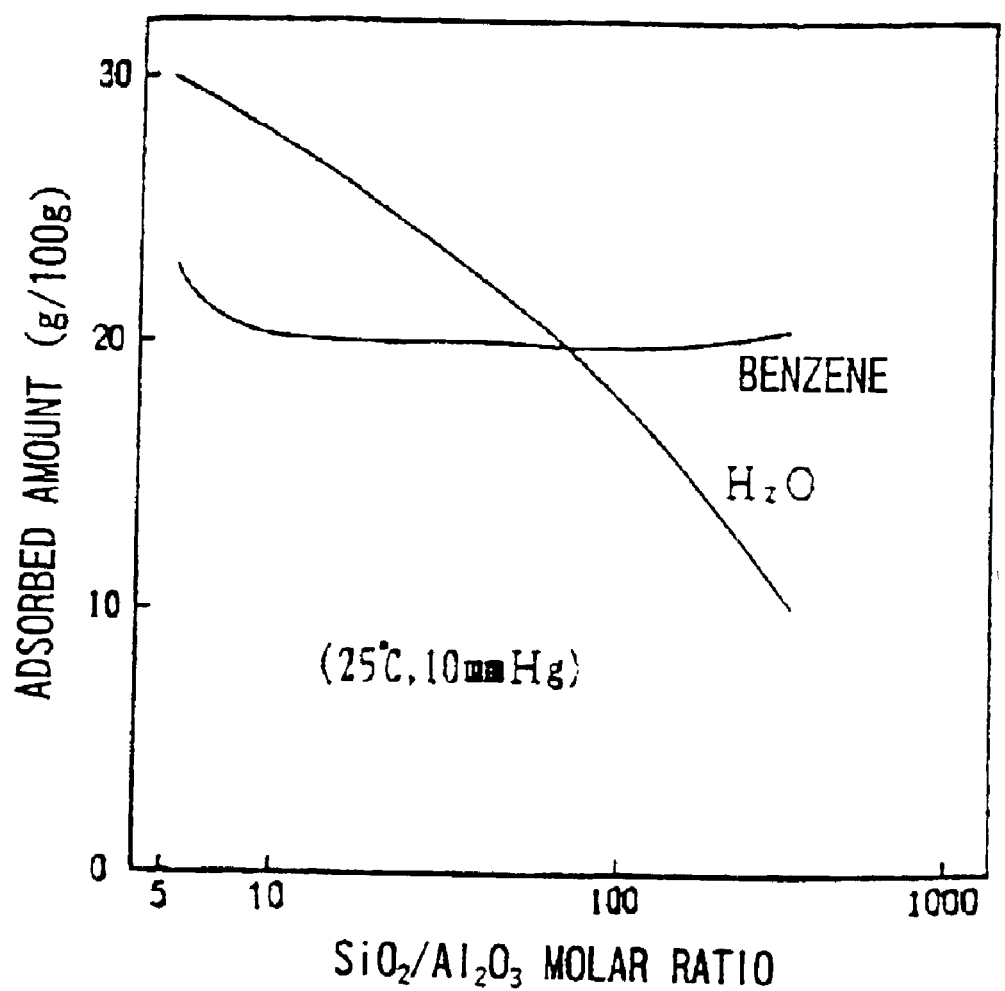
FIG. 5 is a graph showing the relation between the $SiO_2/Al_2O_3$ molar ratio and the adsorbed amount for water and benzene.

FIG. 5 is a graph showing the relation between the molar ratio of $SiO_2$ with respect to $Al_2O_3$ ($SiO_2/Al_2O_3$), both constituting zeolite, and the adsorbed amount for water and benzene. The lines showing the adsorbed amount for water and benzene cross at an $SiO_2/Al_2O_3$ value of about 70. Accordingly, in the invention, 10 to 90% (by weight) of a weak hydrophobic zeolite having an $SiO_2/Al_2O_3$ value smaller than the crossing point value (i.e., $SiO_2/Al_2O_3=70$) and 90 to 10% (by weight) of a strong hydrophobic zeolite with an $SiO_2/Al_2O_3$ value exceeding the crossing point value were both carried on the honeycomb-like laminate body 22. In the embodiment below, an adsorption test was performed by using a rotor 2 comprising a honeycomb-like laminate body 22 carrying thereon equivalent amounts of a weak hydrophobic zeolite having an $SiO_2/Al_2O_3$ molar ratio of 60 and a strong hydrophobic zeolite having a molar ratio of 200.

EXAMPLES

The air to be cleaned used herein was prepared by mixing 62 to 75 ppb of ammonia as an inorganic gaseous chemical substance and 740 to 800 ppb of N-methylpyrrolidone (NMP) as an organic gaseous chemical substance. The gas to be treated was fed at a flow rate of approximately 3 m³/min into the cleaned air feeding apparatus 1 equipped with the rotor 2. Regeneration was carried out with air at 175° C. and flowing at a rate of approximately 0.5 m³/min. Cooling was performed with air at room temperature (20° C.) flowing at a rate of approximately 0.5 m³/min.

Because about 1 hour was necessary to attain stable flow of the air to be cleaned and the regenerating air into the cleaned air feeding apparatus 1, sampling of the air to be cleaned and the like for use in analysis was effected 1 hour after setting the apparatus. For the analysis of ammonia, each of the gases was sucked at a rate of 2 L/min for 3 hours by using a diaphragm mini-pump via an impinger (connected in two stages) set with an absorbing solution, and the ammonia in the absorbing solution was analyzed by means of ion chromatograph to obtain the ammonia concentration for each of the gases. For the analysis of NMP, each of the gases was sucked by using a diaphragm mini-pump via an adsorption tower packed with an adsorbent, and the amount of sucked gas was measured with a dry gas meter for sampling. The NMP adsorbed by the adsorbent was expelled by using an inert gas while heating the adsorbent, and the NMP contained in the inert gas was measured by using TCT-GC/MS method. The measured results are given in Table 1.

TABLE 1

|  | $NH_3$ (ppb) | NMP (ppb) |
| --- | --- | --- |
| Air to be cleaned (in) | 62 | 740 |
| Air to be cleaned (out) | 1.4 | 0.1 or lower |
| Efficiency of removal (%) | 97.7 | 100 |
| Regenerating air | 390 | 4440 |
| Efficiency of regeneration (%) | 107.3 | 100 |

It can be understood that NMP is approximately 100% removed, and that is then regenerated. In the case of ammonia, the efficiency of removal as well as that of regeneration depends on the temperature, and referring to Table 1, in particular, the efficiency of regeneration exceeds 100%. However, both efficiencies of removal and regeneration approach approximately 100% over the long term. The cleanliness class of the air to be cleaned was maintained at about 100.

In the embodiment above, the circulation air was cleaned by using the cleaned air feeding apparatus 1. However, there can be mentioned another embodiment in which outside air alone is cleaned by the cleaned air feeding apparatus 1 without circulating the air inside the clean room main body 32. In this manner, the gaseous chemical substance contained in the outside air can be removed while reducing the volume of the cleaned air feeding apparatus 1. Furthermore, there can be mentioned a further embodiment in which the circulating air and the outside air are cleaned in a separate cleaned air feeding apparatus 1, or another embodiment in which the amount of circulated air passed through the cleaned air feeding apparatus 1 is increased or decreased depending on the contamination state inside the clean room main body 32.

In the embodiment above, a temperature and humidity controlling means is not provided, but a temperature and humidity controlling means that is generally used in an air conditioner may be provided on the down stream side of the filter 6, and temperature detection means and humidity detection means may be provided inside the clean room. Thus, the temperature and humidity controlling means may be controlled to adjust the temperature and humidity inside the clean room.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and the range of equivalency of the claims are therefore intended to be embraced therein.

As described above, the invention provides the following effects.

According to a first aspect of the invention, the cleaned air feeding apparatus carries an adsorbent for adsorbing and desorbing gaseous chemical substances, and comprises an adsorbing part and regenerating part which are used by switching them. In the adsorbing part, the gaseous chemical substances are removed and the air is supplied to the clean room main body, and in the regenerating part, the gaseous chemical substances that have been adsorbed are desorbed and regenerated by using heated air, such that sufficiently cleaned air is supplied semi-permanently to the clean room main body. Furthermore, since most of the gaseous chemical substances are often adsorbed to the surface of the fine dust particles, the fine dust can be similarly removed. In this manner, there can be obtained cleaned air having a cleanliness class of 1000 or lower, preferably 100 or lower.

Further, according to second aspect of the invention, adsorption and desorption can be effected efficiently because the adsorbing member is carried on a honeycomb-like laminate body.

In accordance with a third aspect of the invention, the honeycomb-like laminate member is a rotor shaped into an approximately cylindrical body, and the rotor is rotation driven by using a drive, means in the order of the adsorbing part, the regenerating part, and the cooling part. Hence, the gaseous chemical substances can be efficiently adsorbed at the adsorbing part, while efficiently carrying out desorption and cooling at the regenerating part and the cooling part, respectively.

According to a fourth aspect of the invention, in case air that has passed through the adsorbing member contains dust that has passed through the adsorbing member or dust generated from the adsorbing member, these dust is removed by a dust filter. Thus, cleaned air with a further high cleanliness class can be supplied to the clean room.

According to a fifth aspect of the invention, the gaseous chemical substances, present in trace amounts, and still remaining in the cleaned air that has passed through the dust filter after passing through the adsorbing part, is adsorption removed by a chemical adsorption filter.

In accordance with a sixth aspect of the invention, the temperature and the humidity of the cleaned air, which is passed through the dust filter and/or the chemical adsorption filter after passing through the adsorbing part, are controlled before the air is supplied to the clean room main body.

According to a seventh aspect of the invention, a weak hydrophobic zeolite and a strong hydrophobic zeolite are used as the adsorbing member. Thus, an inorganic gaseous chemical substance such as ammonia and sulfur oxide, as well as an organic solvent can be effectively adsorbed and removed in the adsorbing part.

According to an eighth aspect of the invention, the weak hydrophobic zeolite has an $SiO_2/Al_2O_3$ ratio in a range of from 5 to 70 (molar ratio), and the strong hydrophobic zeolite has an $SiO_2/Al_2O_3$ ratio exceeding 70.

What is claimed is:

1. A clean room, comprising:
    a clean room main body; and
    a cleaned air feeding apparatus for cleaning air of gaseous chemical substances to a cleanliness class of 1000 or lower and feeding the cleaned air to said clean room main body, said cleaned air feeding apparatus comprising:
        an adsorbing member to adsorb and desorb the gaseous chemical substances, said adsorbing member comprising a blend of weak hydrophobic zeolite and strong hydrophobic zeolite which are blended at a predetermined ratio;
        an adsorbing part operable to adsorb the gaseous chemical substances from air being cleaned with said adsorbing member; and
        a regenerating part operable to desorb the gaseous chemical substance from said adsorbing member using heated air;
    wherein said adsorbing part and said regenerating parts are structured and arranged with respect to said adsorbing member such that the cleaned air that is fed to said clean room main body by said cleaned air feeding apparatus has been cleaned of the gaseous chemical substances by removing the gaseous chemical substances in said adsorption part.

2. The clean room of claim 1, wherein:
    said adsorbing member is carried by a honeycombed laminate body; and
    said cleaned air feeding apparatus has a drive means for transferring said honeycombed laminate body between said adsorbing part and said regenerating part.

3. The clean room of claim 1, wherein said cleaned air feeding apparatus comprises:
    a rotor including a honeycombed laminate body that is formed in an approximately cylindrical shape and carries said adsorbing member, said rotor being constituted such that air can pass along an axial direction of said honeycombed laminate body;
    a drive means for rotating said rotor around an axis of said rotor;
    an air guide part on both ends of said rotor with respect to an axial direction of said rotor, said air guide part being formed in sections along a peripheral direction of said rotor in order of said adsorbing part, said regenerating part and a cooling part, and wherein said air guide part comprises:
        a cleaned air guide part to supply air containing gaseous chemical substances to one side of said adsorbing part in the axial direction of said rotor and to supply the air to said clean room main body from an other side of said adsorbing part with respect to the axial direction of said rotor,
        a regenerating air guide part to supply air for regeneration to one side of said regenerating part with respect to the axial direction of said rotor and to eject the air from the other side of said regenerating part, and a cooling air guide part to supply air for cooling to one side of said cooling part with respect to the axial direction of said rotor and to eject the air from the other side of said cooling part with respect to the axial direction of said rotor, wherein the one side of said adsorbing part, the other side of said regenerating part and the other side of said cooling part are on the same side of said rotor; and a heater to heat the air supplied to said regenerating part.

4. The clean room of claim 1, wherein a dust removing filter is provided inside said cleaned air guide part between said adsorbing part and said clean room main body.

5. The clean room of claim 1, wherein a chemical adsorption filter is provided inside said cleaned air guide part between said adsorbing part and said clean room main body.

6. The clean room of claim 1, wherein a temperature and moisture control part is provided inside said cleaned air guide part between said adsorbing part and said clean room main body.

7. The clean room of claim 1, wherein said predetermined blend ratio of weak hydrophobic zeolite and strong hydrophobic zeolite comprises 10 to 90% by weight of the weak hydrophobic zeolite and 90 to 10% by weight of strong hydrophobic zeolite.

8. The clean room of claim 7, wherein the weak hydrophobic zeolite has an $SiO_2/Al_2O_3$ ratio in a range form 5 to 70 by molar ratio and the strong hydrophobic zeolite has an $SiO_2/A_{12}O_3$ ratio in a range greater than 70 by molar ratio.

9. A clean room comprising:

a clean room main body; and a cleaned air feeding apparatus operable to clean air of gaseous chemical substances to a cleanliness class of 1000 or lower and to feed the cleaned air to said clean room main body, said cleaned air feeding apparatus comprising:

an adsorbing member that is operable to adsorb and desorb the gaseous chemical substances from air being cleaned and to regenerating air, respectively, said adsorbing member comprising a blend of weak hydrophobic zeolite and strong hydrophobic zeolite which are blended at a predetermined ratio that has been determined based on the gaseous chemical substances to be removed from the air being cleaned;

an adsorbing part operable to adsorb the gaseous chemical substances from air being cleaned with said adsorbing member; and a regenerating part operable to desorb the gaseous chemical substances that have been adsorbed at said adsorbing part from said adsorbing member using regenerating air;

wherein said cleaned air feeding apparatus is operable to switch between a part of said adsorbing member being used by said adsorbing part to adsorb the gaseous chemical substances from the air being cleaned to the part being used by said regenerating part to desorb the gaseous chemical substances so that the part can be reused by said adsorbing part.

10. The clean room of claim 9, wherein said cleaned air feeding apparatus comprises a rotor including said adsorbing member, said rotor being operable to switch the part of said adsorbing member between said adsorbing part and said regenerating part.

11. The clean room of claim 9, wherein said cleaned air feeding apparatus comprises:

a rotor including a honeycombed laminate body that is formed in an approximately cylindrical shape and carries said adsorbing member, said rotor being constituted such that air can pass along an axial direction of said honeycombed laminate body;

a drive operable to rotate said rotor around an axis of said rotor;

an air guide part on both ends of said rotor with respect to an axial direction of said rotor, said air guide part being formed in sections in a peripheral direction of said rotor in order of said adsorbing part, said regenerating part and a cooling part, and wherein said air guide part comprises:

a cleaned air guide part to supply air containing gaseous chemical substances to one side of said adsorbing part in the axial direction of said rotor and to supply the air to said clean room main body from an other side of said adsorbing part with respect to the axial direction of said rotor, a regenerating air guide part to supply air for regeneration to one side of said regenerating part with respect to the axial direction of said rotor and to eject the air from the other side of said regenerating part, and a cooling air guide part to supply air for cooling to one side of said cooling part with respect to the axial direction of said rotor and to eject the air from the other side of said cooling part with respect to the axial direction of said rotor, wherein the one side of said adsorbing part, the other side of said regenerating part and the other side of said cooling part are on the same side of said rotor; and a heater to heat the air supplied to said regenerating part.

12. The clean room of claim 9, wherein said cleaned air feeding apparatus is operable to clean air of the gaseous chemical substances to a cleanliness class of 100 or lower.

* * * * *

UNITED STATES PATENT AND TRADEMARK OFFICE
CERTIFICATE OF CORRECTION

PATENT NO. : 6,960,236 B1
DATED : November 1, 2005
INVENTOR(S) : Yoshio Tamura et al.

It is certified that error appears in the above-identified patent and that said Letters Patent is hereby corrected as shown below:

<u>Title page,</u>
Item [87], PCT Pub No., change "WO01/36820" to -- WO01/36880 --.

Signed and Sealed this

Twenty-fourth Day of January, 2006

JON W. DUDAS
*Director of the United States Patent and Trademark Office*